United States Patent
Caspersen et al.

(10) Patent No.: US 10,844,498 B2
(45) Date of Patent: Nov. 24, 2020

(54) METALLIC COATING WITH MACRO-PORES

(71) Applicant: Siemens Aktiengesellschaft, Munich (DE)

(72) Inventors: Michael Caspersen, Vanlose (DK); Sune Daaskov Egelund, Gentofte (DK); Per Moeller, Esrum (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 127 days.

(21) Appl. No.: 15/573,547

(22) PCT Filed: May 13, 2015

(86) PCT No.: PCT/EP2015/060626
§ 371 (c)(1),
(2) Date: Nov. 13, 2017

(87) PCT Pub. No.: WO2016/180492
PCT Pub. Date: Nov. 17, 2016

(65) Prior Publication Data
US 2018/0100241 A1    Apr. 12, 2018

(51) Int. Cl.
*C25D 5/02* (2006.01)
*C25D 13/22* (2006.01)
(Continued)

(52) U.S. Cl.
CPC .......... *C25B 11/03* (2013.01); *C25B 11/0478* (2013.01); *C25D 5/10* (2013.01);
(Continued)

(58) Field of Classification Search
CPC ... C25D 3/12; C25D 7/00; C25D 5/02; C25D 5/10; C25D 13/22; C25D 17/16; C25D 13/20; C25D 17/10
(Continued)

(56) References Cited

U.S. PATENT DOCUMENTS 4,496,442 A   1/1985 Okazaki et al. ............... 205/638
4,668,370 A   5/1987 Pellegri ........................ 204/252
(Continued)

FOREIGN PATENT DOCUMENTS

WO   2016/180492 A1   11/2016   ............. C25B 11/03

OTHER PUBLICATIONS

International Search Report and Written Opinion, Application No. PCT/EP2015/060626, 14 pages, dated Jan. 12, 2016.
(Continued)

*Primary Examiner* — Zulmariam Mendez
(74) *Attorney, Agent, or Firm* — Slayden Grubert Beard PLLC

(57) ABSTRACT

The present disclosure relates to coatings. For example, some embodiments may include methods for producing a coating comprising: depositing a metallic matrix on a substrate by electrochemical deposition using a deposition bath including carbon comprising particles and oxide particles dispersed therein; wherein the carbon comprising particles are embedded into the metallic matrix and pores are distributed in the coating; wherein at least 80% of the pores have a pore diameter in a range from 3 to 30 µm; wherein oxide particles are incorporated into and fixed in the pores during deposition and the oxide particles remain partially uncoated by the material of the metallic matrix.

13 Claims, 3 Drawing Sheets

(51) Int. Cl.
  *C25D 17/16* (2006.01)
  *C25D 13/20* (2006.01)
  *C25D 17/10* (2006.01)
  *C25B 11/03* (2006.01)
  *C25B 11/04* (2006.01)
  *C25D 5/12* (2006.01)
  *C25D 5/48* (2006.01)
  *C25D 7/00* (2006.01)
  *C25D 15/00* (2006.01)
  *C25D 5/10* (2006.01)
  *C25D 15/02* (2006.01)
  *C25D 3/12* (2006.01)
  *C25D 3/38* (2006.01)
  *C25D 3/56* (2006.01)
  *C25B 1/04* (2006.01)

(52) U.S. Cl.
  CPC ............... *C25D 5/12* (2013.01); *C25D 5/48* (2013.01); *C25D 7/00* (2013.01); *C25D 15/00* (2013.01); *C25D 15/02* (2013.01); *C25B 1/04* (2013.01); *C25D 3/12* (2013.01); *C25D 3/38* (2013.01); *C25D 3/562* (2013.01); *Y02E 60/366* (2013.01)

(58) Field of Classification Search
  USPC .......................................................... 205/109
  See application file for complete search history.

(56) References Cited

U.S. PATENT DOCUMENTS

| | | | |
|---|---|---|---|
| 4,960,653 A | 10/1990 | Yokoi | 428/613 |
| 4,960,654 A | 10/1990 | Yoshinaka et al. | 428/614 |
| 5,645,930 A | 7/1997 | Tsou | 428/328 |

OTHER PUBLICATIONS

Chinese Office Action, Application No. 201580079943.0, 11 pages, dated Oct. 16, 2018.

METALLIC COATING WITH MACRO-PORES

CROSS-REFERENCE TO RELATED APPLICATIONS

This application is a U.S. National Stage Application of International Application No. PCT/EP2015/060626 filed May 13, 2015, the contents of which is hereby incorporated by reference in their entirety.

TECHNICAL FIELD

The present disclosure relates to coatings. The teachings thereof may be embodied in methods for producing a coating with macro-pores.

BACKGROUND

Coated substrates are used for a lot of purposes. Because of the huge surface area provided by the pores, substrates like these can be used as catalytic reaction accelerators. In alkaline electrolysis and catalysis in general, electrodes with a large surface area per geometric area is agreed to be desirable due to many available reaction sites for a given chemical reaction thus resulting in a more effective catalyst. This is known to be important both for anodic and cathodic reactions.

There are methods of optimizing the surface area. For example, anodes performing the OER (oxygen evolution reaction) and cathodes performing the HER (hydrogen evolution reaction) of alkaline water electrolysis are typically made from non-activated pure nickel or nickel-plated steel as these electrodes tend to be long-term stable. They can be activated by a thermal procedure where a precursor is decomposed directly on top of the electrode leading to a desired oxide phase as a thermally prepared film. A disadvantage when using this procedure is that the necessary calcination temperature is high and that the structure is rather brittle and fragile. It is also only small fraction of the active oxides which can be prepared in this way.

The state of the art in alkaline electrolysis uses so-called Raney electrodes. To obtain Raney electrodes a selective leaching of a material, typically aluminum or zinc, from a metal matrix of nickel, produces a highly porous structure with microscopic sized cavities and hence a large surface area. This structure, regardless of the applied manufacturing technique, has however been reported to lack mechanical stability. This raises the danger of a delamination of the coating from the substrate. So, another hurdle in obtaining suitable electrodes lies in the creation of sufficient adherence between the activated coating and the substrate. Because of such difficulties plain nickel or stainless steel electrodes are utilized in large scale plants to obtain durability with lowered efficiency as a compromise.

It is known to produce a porous coating by incorporating graphite particles into an electroplated coating. In DE 2900453 a coating like that can be used in a heat exchanger to enhance the boiling capabilities of the surface provided for a heat exchange. The challenge is to produce electrodes that can endure the harsh environment and operating conditions of the alkaline electrolysis. The electrodes shall remain active and stable during electrolysis, heat-up and cool-down cycles and at open circuit without any severe delamination.

SUMMARY

Therefore, there is a need to provide and produce a catalytic surface on substrates which has a large surface area combined with low-cost production capabilities, durability and stability, i.e. chemical resistance as well as mechanical strength. The teachings of the present disclosure may be embodied in coatings comprising a metallic matrix on a substrate by electrochemical deposition wherein carbon comprising particles are dispersed in the deposition bath whereby the carbon comprising particles are embedded into the metallic matrix and pores are located in the coating enlarging the surface of the coating. The enlargement of the coating is the consequence of the fact that the pores are open to the surroundings of the coating and become therefore part of the surface area of the coating by being reachable by a medium (gas or liquid) which is in contact with the coating. The teachings may be embodied in a coated substrate whereby the coating comprises a metallic matrix in which the carbon comprising particles are embedded and in which a metallic matrix comprises pores enlarging the surface of the coating.

For example, some embodiments may include methods for producing a coating (13) comprising a metallic matrix (17) on a substrate (11) by electrochemical deposition wherein carbon comprising particles (14) are dispersed in the deposition bath whereby the carbon comprising particles (14) are embedded into the metallic matrix (17) and pores are located in the coating (13) enlarging the surface of the coating (13) characterized in that the pores have the dimensions of macro-pores (15) whereby at least 80% of the macro-pores (15) have a pore diameter in a range from 3 to 30μπι and that together with the carbon comprising particles (14) also oxide particles (16) are dispersed in the deposition bath, whereby the oxide particles are incorporated into and fixed in the macro-pores (15) while deposition and whereby the oxide particles remain partially uncoated by the material of the metallic matrix (17).

In some embodiments, the metallic matrix (17) comprises nickel, silver or copper as main component.

In some embodiments, at least 90% of the carbon comprising particles (14) have a size in a range from 3 to 40 μm.

In some embodiments, the coating (13) is produced with a thickness in a range of 5 to 200 μm.

In some embodiments, the carbon comprising particles (14) consist from boron carbide, silicon carbide, graphite, carbon, activated graphite or activated carbon.

In some embodiments, a sheet, a perforated plate, a lattice or a mesh is used as the substrate (11) is plated.

In some embodiments, a base layer (12), especially of nickel, copper or silver, is plated on the substrate (11) before starting said simultaneous deposition of carbon comprising particles (14) and the metallic matrix (17).

In some embodiments, the coating (13) is coated with a surface layer (18) of a catalytic material whereby the surface layer (18) extends into or interlocks in the macro-pores.

In some embodiments, the catalytic material is chosen from the group of zinc, tin, copper, aluminum, molybdenum, silver, iron and cobalt, manganese, chromium, tungsten, zirconium, titanium, sulfur or alloys of these elements.

In some embodiments, the surface layer (18) is coated by electrochemical deposition whereby uncoated parts of the partially uncoated oxide particles (16) remain also uncoated by the surface layer (18).

In some embodiments, the surface area of the surface layer (18) is enlarged by leaching whereby meso-pores (20) whereby at least 80% of the meso-pores (20) have a pore diameter in a range from 1 to 3 μm and/or micro-pores (21) whereby at least 80% of the micro-pores (21) have a pore diameter in a range less than 200 nm are build.

Some embodiments may include a coated substrate whereby: the coating (13) comprises a metallic matrix (17) in which carbon comprising particles (14) are fully embedded; the metallic matrix (17) comprises pores enlarging the surface of the coating (13) characterized in that pores in the metallic matrix (17) are macro-pores (15); and oxide particles are fixed in the macro-pores (15) whereby the oxide particles are only partially embedded into the metallic matrix (17) and are partially exposed to the volume of the macro-pores (15).

In some embodiments, the coating (13) comprises a surface layer (18) which extends into the macro-pores (15)

In some embodiments, the surface layer (18) comprises meso-pores (20) and/or micro-pores (21) enlarging the surface of the surface layer (18).

In some embodiments, the substrate (11) is coated as described above.

Some embodiments may include using coated substrates (11) as described above as electrodes in electrocatalytic or catalytic processes.

In some embodiments, the electrochemical process is an electrolysis of water and the electrodes are used as anode (22) and/or as cathode (23).

BRIEF DESCRIPTION OF THE DRAWINGS

The teachings of the present disclosure are further expounded in the drawings whereby similar drawing elements are denoted by the same reference numerals respectively and are only explained once in below unless there are to be specified differences between the figures.

DETAILED DESCRIPTION

Figure 1:
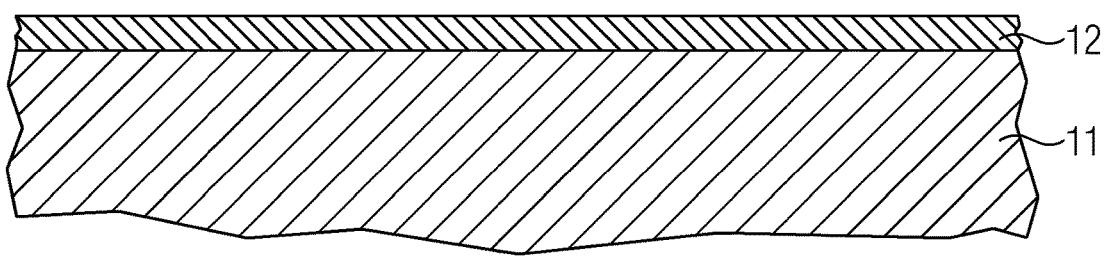
FIGS. 1-4 show several process steps according to an example of the methods taught herein depicting an example of the coated substrate as cross-sectional view and FIG. 5 shows an example of the use of the coated substrates as electrodes of a water electrolysis application as cross-sectional view.

The teachings of the present disclosure may result in embodiments wherein the pores have the dimension of macro-pores. In some embodiments, along with the carbon comprising particles also oxide particles are dispersed in the dispersion bath. As a result, at least 80% of the macro-pores have a pore diameter in a range from 3 to 30μπι. This distribution of the pore diameter shall apply for the term macro-pores in the context of this invention.

The oxide particles may be incorporated into and fixed in the macro-pores by deposition whereby the oxide particle remain partially uncoated by the material of the coating matrix. The oxide particles remain uncoated because of their abilities of nonconducting electricity. The process of fixing them into to the macro-pores will lead to oxide particles partially embedded into the metallic matrix but this effect cannot be understood as a process of coating. The process can rather be described by growing of the metallic matrix around the oxide particles as embedding effect.

Some embodiments may include a coated substrate. The substrates may include macro-pores in the surface and oxide particles fixed in the macro-pores whereby these oxide particles are only partially embedded into the metallic matrix and are partially exposed to the volume of the macro-pores which have access to the outer surface of the coating. That means that the oxide particles are accessible for a medium and a reaction like the alkaline water electrolyses can be catalysed in this medium.

Some embodiments include the addition of a carbon component in form of carbon comprising particles which functions as a macro-pore creator. Controlled stirring and dosing makes it possible to obtain different loadings of carbon comprising particles in the metallic matrix and great thicknesses of the coating. The macro-pores provide a comparatively large surface area of the metallic matrix of the coating. The electrically conductive carbon comprising particles which are co-deposited with the metal matrix act as antennas for further reduction of the metal ions presented in the electrolyte and the layer is slowly build-up until a sufficient thickness is reached. This is the reason why the carbon comprising particles are fully embedded into the metallic matrix of the coating.

In some embodiments, the carbon comprising particles (14) consist from boron carbide, silicon carbide, graphite, carbon, activated graphite, and/or activated carbon. Due to its intrinsic high roughness factor, activated carbon or graphite powders may be incorporated while electroplating into the metallic matrix of the coating and contribute to the build-up of a 3D porous Ni—C lattice structure with an increased macro-pore density. A model for the deposition mechanism for the coating layer is that carbon comprising particles are attracted to the negative electrode in the deposition bath, upon which the metal ions, e.g. nickel, can nucleate. This structure can be used as a precursor layer for a subsequent deposition of catalytic coatings.

The process makes it also possible to load even non-conducting catalyst particles interlocked into the macro-pores in the metallic matrix while depositing the coating. The porosity created by the carbon comprising particles secures a path for the electrolyte or gas, so that it can reach the inner parts of the macro-pores and the catalyst particles. Various oxides have been proposed as suitable for reduction of the OER overpotential in alkaline media and become accessible to be integrated into the inventive coating to create electrodes for the alkaline water electrolysis. For example, some appropriate oxides may include Ba0,5Sro, 5Coo,8Feo,2O3, La0,5io,5CoO3, SrFe0,5Co0,5O3, La0, 6Sr0,4COo,8Feo,2O3, LaNiO3, NiCo2O4, and CoxCoi_xO4. These catalysts are typically produced as powders which can be incorporated into the macro-pores using the described methods of electroplating.

The metallic coating may include several metals. Examples may include a metal which can be deposited with ease even without additives like nickel, silver, or copper. These metals can be coated with a surface layer which shows a comparably good adhesion on these metals. The network structure of carbon comprising particles further constitutes a macro porous base structure for an additional coating build-up of any kind, thus making it possible to tailor a desired material deposition with a macro porous structure by varying the composition of the electrolyte and the plating parameters as well. Therefore, a procedure is provided for the production of a low cost metallic substrate suitable for post-coating via electrochemical or thermal procedures hereby preparing metallic surfaces which is well adhered on the metallic matrix of the coating and mechanically stable an serves as catalyst. However, the oxide particles in the macro-pores remain at least partially uncoated providing their surface for catalytic purposes.

In some embodiments, the coating is coated with a surface layer of a catalytic material whereby the surface layer extends into or interlocks in the pores which have the dimensions of macro-pores. The coated substrate can be used as electrodes in electrochemical processes like the electrolysis of water. The fact that the pores are accessible to the medium (gas, liquid) in which a reaction shall be catalysed takes advantage of the fact the surface area of the coated substrate with the surface layer is enlarged and facilitates the catalytic abilities of the coated substrate.

The obtained coating can be used for both heterogeneous catalysis and electrocatalysis in both gas and liquid. The method can be used for manufacturing of anodes for alkaline water electrolysis but is not limited to this purpose. It could also be applied, for example, in the cathodes of the alkaline water electrolysis or other types of electrocatalysis.

In some embodiments, at least 90% of the carbon comprising particles have a size in a range from 3 to 40 μm. Carbon comprising particles of this size range show a distinct behavior as a macro-pore producing agent. That means that the macro-porosity can be produced on a high level and a maximum surface area can be provided for catalytic purposes. In some embodiments, the coating is produced with a thickness in a range of 5 to 200 μm. In this range of thickness, the build-up of pores is possible in a manner that at least the mayor portion of the pores has direct or indirect access to the outer surface of the coating and therefore can be used as catalytic surface.

In some embodiments, the catalytic material of the surface layer is chosen from the group of zinc, tin, copper, aluminum, molybdenum, silver, iron, cobalt, manganese, chromium, tungsten, zirconium, titanium, sulfur, and/or alloys of these elements. These metals can be deposited on the metallic matrix of the coating. This can be done by electrochemical deposition, physical vapor deposition, chemical vapor deposition, and/or thermal spraying. These metals or metal alloys can diffuse into the metal matrix. In some embodiments, nickel, silver, and copper are used as the metal matrix. The diffusion can be facilitated by a heat treatment of the compound comprising the metallic matrix of the coating and the surface layer. The respective metal diffusion couples form some sort of leachable phases which can be partially removed by a leaching procedure (this activation procedure for example uses KOH).

The result is a build-up of meso-pores and/or micro-pores which significantly raise the catalytic surface by forming a skeletal catalyst structure in the surface layer and the region of the metal matrix which was involved in the diffusion process of the material of the surface layer. The meso-pores are characterized in that at least 80% of the meso-pores have a pore diameter in a range from 1 to 3μπι. The micropores are characterized in that at least 80% of the micro-pores have a pore diameter in a range less than 200 nm. This distribution of the pore diameter of meso-pores and micropores shall apply for the term micro-pores and meso-pores respectively in the context of this disclosure. The rest of the metal matrix provides a stabile lattice with said macro-pores. So, the complete structure may be long term stable according to its mechanical properties also in harsh environments like water electrolysis.

In some embodiments, the methods may include co-depositing a nickel zinc alloy which is suitable for leaching or other leachable alloys as a surface layer. This would eliminate the need for a heat treatment of the surface layer before leaching. If the coated substrate is used in a reactive environment like KOH (which is the case for an alkaline water electrolysis), a leaching occurs during the intended use of the coated substrate as electrode.

In some embodiments, a sheet, a perforated plate, a lattice, and/or a mesh is used as a substrate. By this measure the surface area can be raised in macroscopic dimensions. A lattice or a mesh can be provided as 3-dimensional structure. The relation between the mesh size or the lattice interspaces and the substrate material can be chosen with view to an optimum according to the accessibility by the medium which includes the reaction partners of the reaction to be catalyzed.

In some embodiments, the methods may include the deposition of a base layer, especially of nickel, copper, and/or silver, which is plated on the substrate before starting the mentioned simultaneous deposition of the particles and the metallic matrix. This base layer can be used as an adhesion promoter between the substrate and the metallic matrix of the coating.

In FIG. 1 there is depicted a substrate 11 coated with a base layer 12 consisting of nickel. The process parameters are specified below.

Figure 2:
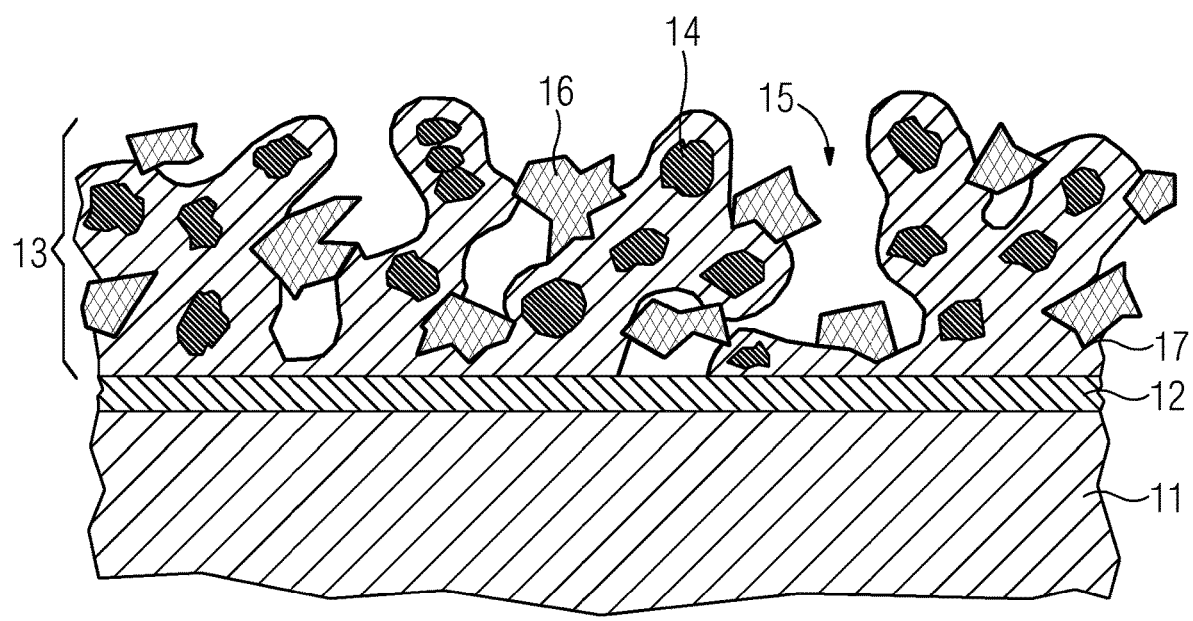

In FIG. 2 there is depicted the next process step whereby one can find three examples for possible process parameters below for plating a coating 13 comprising carbon comprising particles which are activated graphite particles 14 in this example. This coating 13 is plated by an electrochemical coating process whereby the graphite particles 14 are laid down to the surface of the base layer 12 in the beginning of the deposition and later are contacted to each other building up a network or lattice which is electrically conductive.

This network serves to influence the electric field in the surrounding of the base layer 12 in that kind that the nickel ions from the plating bath preferably are attached to the graphite particles 14. The graphite particles are fully embedded this way into a metallic matrix 17 whereby the network of graphite particles 14 are not fully filled with nickel and therefore a build-up of macro-pores 15 occurs. The pore diameter of the macro-pores 15 lies in a range from 50 to 500 μm. The pore diameters are directly influenced by the choice of the graphite particles in a certain size range. A size range in which 90% of the graphite particles have a size from 3-40 μm results in a favorable pore size distribution.

In the plating bath for the coating 13 also oxide particles 16 are dispersed, for example NiCo2O4, whereby the oxide particles are chosen with the required catalytic abilities in mind. Further examples for oxide particles are given below (see examples I-III for the particles containing coating).

The oxide particles 16 are incorporated into the macro-pores 15 while deposition of the coating 13. Because the oxide particles are not conductive or at least much less conductive than the graphite particles the surface of the oxide particles remain uncoated by the material of the metallic matrix 17. Fixing the oxide particles 16 in the macro-pores 15 occurs by the growth of the metallic matrix 17 which causes a partial inclusion of the oxide particles while the rest of the surface of the oxide particles 16 are exposed to the volume of the macro-pores 15.

Figure 3:
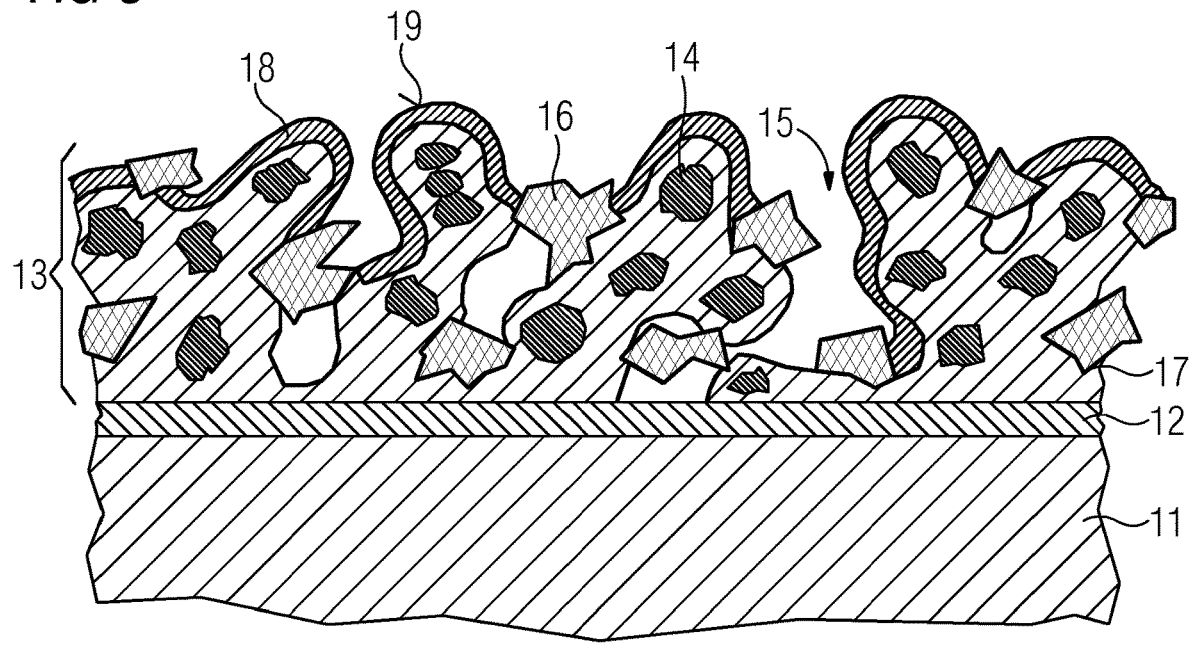

In FIG. 3 there is depicted the next process step which consists of a coating of a surface layer 18 which constitutes at least a part of an outer surface 19 provided by the coating 13. The surface layer 18 also reaches into the macro-pores 15 whereby the surface area provided by the surface layer 18 is raised compared to the case that the surface layer would be coated on a flat substrate. The surface layer can be made from zinc for example which can be plated in a plating bath mentioned below. However, also other coating methods can be performed, for example chemical vapor deposition, physical vapor deposition, and/or thermal spraying, e.g., dynamic cold gas spraying.

Choosing an electrochemical coating method has the advantage mentioned above that the oxide particles 16 remain uncoated also by the material of the surface layer. Also, the application of dynamic cold gas spraying would lead to the effect that the surface layer would be adhered mainly on the metallic matrix of the coating because oxide particles are too hard as a substrate for dynamic cold gas spraying. If other coating methods are chosen like physical vapor deposition or chemical vapor deposition at least oxide particles in the deeper regions of the macro-pores would remain uncoated.

Figure 4:
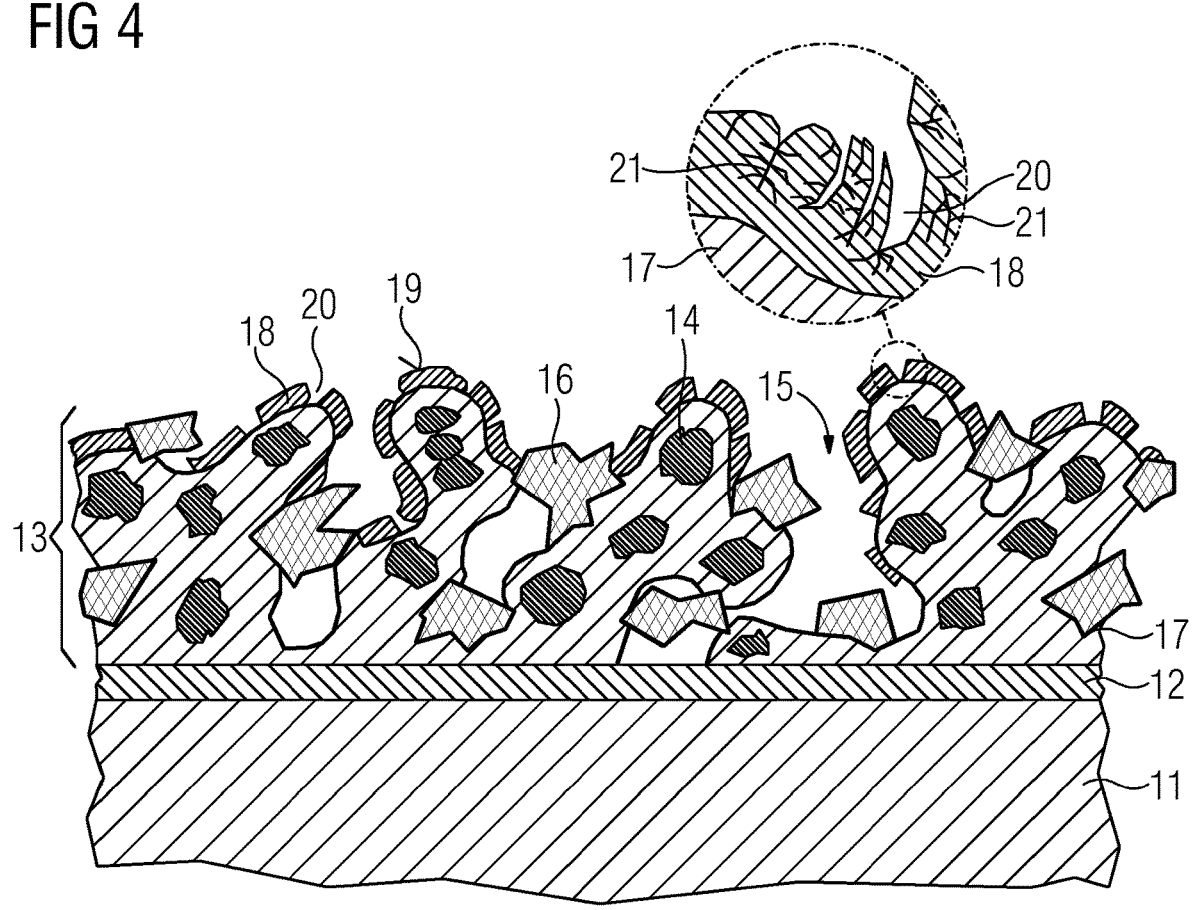

As depicted in FIG. 4, an activation of the surface layer 18 can be executed to further raise the surface area provided by the coating 13. For that purpose a heat treatment results in a diffusion of zinc into the metallic matrix of nickel whereby inter-metallic phases are generated. The activation of the surface is performed by leaching the coating 13 with KOH.

Figure 5:
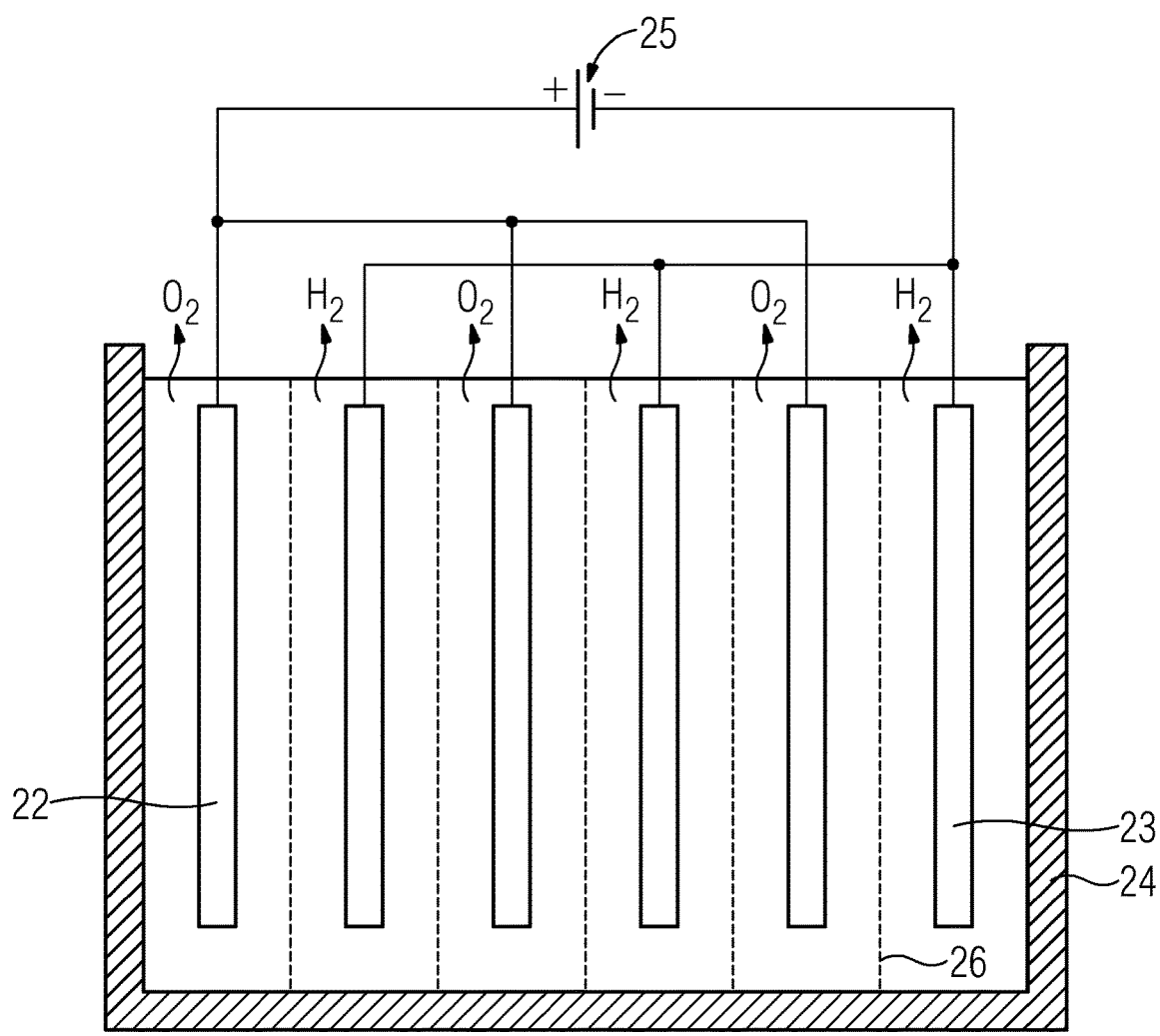

Leaching results in dissolving the inter-metallic phases in the surface layer which, after heat treatment, can be described as a diffusion zone of the metallic matrix 17 containing the inter-metallic phases. After dissolving, the surface layer 18 comprises a system of meso-pores 20 and micropores 21 which significantly raise the surface area of the coating 13. This surface area can be provided as a catalytic converter whereby also the surface of the oxide particles works as a catalyst. As depicted in FIG. 5 the coated substrate 11 of FIG. 4 can be used as electrodes (anodes 22 and cathodes 23) for the electrolysis of water. The anodes 22 and cathodes 23 are placed in a container 24 comprising KOH and are connected with a voltage supply source 25. The anodes 22 and cathodes 23 could be divided by diaphragms 26 from each other. Applying a voltage by the voltage supply source 25 leads to the production of oxygen O2 on the anodes 22 and hydrogen H2 on the cathodes 24.

EXPERIMENTAL

All electrolytic deposited electrodes were degreased and activated using the following procedure prior to deposition of subsequent coatings. The pretreatment procedure was as follows:
Step Treatment Bath Parameters
1. Anodic degreasing 55,5 g/l NaOH 5 min, 5 V
14 g/l Na2SiO3
Washing H,0
Activation 100 g/l 5% NaHF25 min, no
Pickling and 95% NaHSO4 polarization
4. Washing H2O
5. Woods 100 g/l NiCl2-6H2O 5 min,
nickel—strike 100 ml/l HCl (37%) 0,050 Acm<"2>

The following parameters where chosen for the plating an treating steps for
1. the base layer on the substrate,
2. particle containing coating and
3. the surface layer 4. the pretreatment of the surface layer for activation (raising the surface area by building meso-pores and7or micro-pores) Plating bath for base layer: Watts Ni
300 g/l NiSO4-6H2O
45 g/l NiC12-6H2O
Image available on "Original document"
pH: ~3-4
Temp: 50° C.
20 min, 0,05 Acm<"2>
Plating Bath for Particle Containing Coating Example I
100-450 g/l NiSO4*6H2O
20-70 g/l NiCl2
20-50 g/l H3BO3
5-120 g/l activated carbon powder
1-200 g/l oxide powder
i.e. perovskite (AxB!_x03) or spinel (AB204):
(LaNi03, NiCo2O4, LaSrCoO3)
pH: ~3-4
Temp: 50<0>C
20 min, 0,05 Acm<"2> example II
100-450 g/l NiSO4*6H2O
100-450 g/l COSO4*7H2O
20-70 g/l NiCl2
20-50 g/l H3BO3
5-120 g/l activated carbon powder
1-200 g/l oxide powder
i.e. perovskite (AxB!_x03) or spinel (AB204):
(LaNi03, NiCo2O4, LaSrCoO3)
pH: ~3-4
Temp: 50<0>C
20 min, 0,05 Acm<"2> example III
180 g/l CuSO4*5H2O
60 g/l H2SO4
1 g/l NaCl
5-120 g/l boron carbide powder (B4C)
1-200 g/l oxide powder
i.e. perovskite (AxB!_x03) or spinel (AB204):
(LaNi03, NiCo2O4, LaSrCoO3)
pH: <<0-1
Temp: 25<0>C
5-10 min, 0,01-0,1 Acm<-2>
Plating Bath for Surface Layer
Bright Zinc of (supplier: Schlotter Galvanotechnik)
SLOTANIT OT-1 of (supplier: Schlotter Galvanotechnik)
pH: ~5
Temp: 50<0>C
90 min, 0, 02 Acm<"2>
Activation of Surface Layer
Heat treatment 4 h at 350° C.

Activation 2 h in 30 wt % KOH at 25-80° C. A three-electrode cell was used for studies of the half-cell reactions and the overpotentials of these. The activity was characterized at room temperature to avoid disturbance of the reference electrodes. The three-electrode setup was used for evaluation of OER and HER overpotential recording. For long-term evaluation of lab results a test electrolyser stack manufactured by Greenhydrogen.dk was used. The electrodes were in several occasions up-scaled and implemented into this electrolyser. A long-term testing was carried out in full-cells at what was believed to be realizable and realistic conditions using of 50 wt % KOH at 120° C. for alkaline electrolysis. The harsh environment was selected as an electrocatalyst stress enhancer. In the full-cell, where the global potential situation was considered, the anodes were initially ranked against non-activated and polished nickel as cathode material. As for the major achievement in the investigation it was demonstrated that in a cell, equipped with an inventive cathode and a non-activated nickel anode, a global cell potential of approximately 1,67 V after about 3000 hours at 0,4 Acm<"2>, 120° C., 50 wt % KOH could be achieved. The optimized coatings were subsequently up-scaled and the results were transferred to electrode stacks. Here it was verified that a average cell potential of approximately 1,66 V+/−0,02 V was obtained at a temperature of only 95° C. Approximately the same activity was determined for different optimized cathodes at 0,4 Acm<"2> in 30 wt % KOH. The inventive coatings were also used as a combined OER-HER coating for both electrodes, the anode and the cathode.

What is claimed is:
1. A method for producing a coating, the method comprising:

depositing a metallic matrix on a substrate by electrochemical deposition using a deposition bath including a first plurality of particles comprising conductive carbon and a second plurality of particles comprising an oxide, both dispersed therein;

wherein the first plurality of particles are fully embedded into and surrounded by the metallic matrix; and wherein pores are distributed in the coating at least 80% of the pores with a pore diameter in a range from 3 to 30 μm;

wherein the second plurality of particles are fixed in the pores during deposition and at least partially extend beyond a surface of the metallic matrix.

2. A method as claimed in claim 1, wherein the metallic matrix comprises at least one of nickel, silver, and copper.

3. A method as claimed in claim 1, wherein at least 90% of the carbon comprising particles in the deposition bath have a size in a range from 3 to 40 μm.

4. A method as claimed in claim 1, wherein the resulting coating has a thickness in a range of 5 to 200 μm.

5. A method as claimed in claim 1, wherein the carbon comprising particles comprise at least one of boron carbide, silicon carbide, graphite, carbon, activated graphite, or activated carbon.

6. A method as claimed in claim 1, wherein the substrate comprises one of a sheet, a perforated plate, a lattice, or a mesh.

7. A method as claimed in claim 1, further comprising plating a base layer on the substrate before starting the deposition of the metallic matrix.

8. A method as claimed in claim 1, further comprising providing a surface layer of a catalytic material extending into or interlocking with the macro-pores.

9. A method as claimed in claim 8 wherein the catalytic material is chosen from the group consisting of: zinc, tin, copper, aluminum, molybdenum, silver, iron, cobalt, manganese, chromium, tungsten, zirconium, titanium, sulfur, or alloys of these elements.

10. A method as claimed in claim 8, wherein the surface layer is added by electrochemical deposition whereby uncoated parts of the partially uncoated oxide particles remain also uncoated by the surface layer.

11. A method as claimed in claim 8, further comprising enlarging a surface area of the surface layer by leaching to create additional pores;

wherein at least 80% of the additional pores have a pore diameter in a range from 1 to 3 μm and/or at least 80% of the additional pores have a pore diameter in a range less than 200 nm.

12. A method comprising:

performing an electrocatalytic or catalytic process, using an electrode;

wherein the electrode comprises a coating including a metallic matrix comprising a first plurality of particles comprising carbon, the first plurality of particles fully embedded into and surrounded by the metallic matrix;

wherein the metallic matrix further comprises pores enlarging the surface of the coating;

wherein at least 80% of the pores have a pore diameter in a range from 3 to 30 μm; and a second plurality of particles comprising an oxide fixed in the pores whereby the second plurality of particles at least partially extend beyond a surface of the metallic matrix and are partially exposed to the volume of the macro-pores.

13. A method as claimed in claim 12, wherein the electrochemical process includes electrolysis of water.

* * * * *